(12) United States Patent
Haustein et al.

(10) Patent No.: US 8,665,910 B2
(45) Date of Patent: Mar. 4, 2014

(54) MULTI-CELL CHANNEL ESTIMATION IN 3G-LTE BASED VIRTUAL PILOT SEQUENCES

(75) Inventors: Thomas Haustein, Potsdam (DE); Volker Jungnickel, Berlin (DE); Malte Schellmann, Munich (DE); Stefan Schiffermüller, Berlin (DE); Lars Thiele, Berlin (DE); Thomas Wirth, Berlin (DE); Wolfgang Zirwas, Munich (DE)

(73) Assignee: Nokia Siemens Networks Oy, Espoo (FI)

( * ) Notice: Subject to any disclaimer, the term of this patent is extended or adjusted under 35 U.S.C. 154(b) by 335 days.

(21) Appl. No.: 12/991,497

(22) PCT Filed: May 9, 2008

(86) PCT No.: PCT/EP2008/003761
§ 371 (c)(1),
(2), (4) Date: Jan. 31, 2011

(87) PCT Pub. No.: WO2009/135516
PCT Pub. Date: Nov. 12, 2009

(65) Prior Publication Data
US 2011/0122789 A1 May 26, 2011

(51) Int. Cl.
*H04W 56/00* (2009.01)

(52) U.S. Cl.
USPC ........... 370/491; 370/324; 370/328; 370/350; 370/500; 370/503

(58) Field of Classification Search
USPC ............. 370/310.2, 324, 328–339, 349, 350, 370/491, 500, 503–520; 455/422.1
See application file for complete search history.

(56) References Cited

U.S. PATENT DOCUMENTS

| | | | | | |
|---|---|---|---|---|---|
| 5,812,592 | A | * | 9/1998 | Suzuki et al. | 375/142 |
| 5,867,478 | A | * | 2/1999 | Baum et al. | 370/203 |
| 2004/0156386 | A1 | * | 8/2004 | Atarashi et al. | 370/441 |

(Continued)

FOREIGN PATENT DOCUMENTS

| | | |
|---|---|---|
| CN | 1972151 A | 5/2007 |
| EP | 1 589 712 A2 | 10/2005 |
| WO | WO 2007/013560 A | 2/2007 |
| WO | WO 2007/137276 A2 | 11/2007 |

OTHER PUBLICATIONS

Weber, T., et al., "Joint transmission and detection integrated network (JOINT), a generic proposal for beyond 3G systems", $9^{th}$ International Conference on Telecommunications, Beijing, vol. 3, Jun. 2002, 5 pgs.

(Continued)

*Primary Examiner* — Hoon J Chung
(74) *Attorney, Agent, or Firm* — Harrington & Smith (57) ABSTRACT

A concept for estimating interfering channels in a multicellular radio communication system including a plurality of base stations and at least one mobile station is suggest, wherein pilot signals are transmitted from the base stations to at least a mobile station, additional pilot sequences are generated, a pattern is provided which defines a rule for distributing the pilot sequences to the base stations, the pilot sequences are modulated and superposed onto said pilot signals, and a pilot signal received at a mobile station is used for estimating interferences in the communication channel from the base station which transmits the pilot signal.

31 Claims, 9 Drawing Sheets

(56) References Cited

U.S. PATENT DOCUMENTS

| | | | |
|---|---|---|---|
| 2005/0130684 A1* | 6/2005 | Kim et al. | 455/464 |
| 2005/0249319 A1* | 11/2005 | Suh et al. | 375/347 |
| 2006/0198294 A1* | 9/2006 | Gerlach | 370/208 |
| 2006/0291577 A1* | 12/2006 | Boariu | 375/260 |
| 2007/0202816 A1* | 8/2007 | Zheng | 455/91 |
| 2007/0230388 A1* | 10/2007 | Li et al. | 370/313 |
| 2008/0298436 A1* | 12/2008 | Haartsen | 375/142 |
| 2008/0299984 A1* | 12/2008 | Shimomura et al. | 455/446 |
| 2009/0122887 A1* | 5/2009 | Li et al. | 375/260 |
| 2010/0208664 A1* | 8/2010 | Nishio et al. | 370/329 |
| 2011/0003567 A1* | 1/2011 | Lee et al. | 455/127.1 |

OTHER PUBLICATIONS

Thiele, L., et al., "Multi-Cell Channel Estimation using Virtual Pilots", © 2008 IEEE, pp. 1211-1215.

Suh, C., et al., "Channel Estimation Technique for Mitigating ICI in MIMO-OFDM Cellular Systems", © 2004 IEEE, pp. 2679-2683.

Speth, M., et al., "Optimum Receiver Design for Wireless Broad-Band Systems Using OFDM-Part 1", © 1999 IEEE, pp. 1668-1677.

Lee, J., et al., "Performance Improvement of Channel Estimation based on Pilot Structure Variations for Cellular OFDMA Systems", © 2004 IEEE, pp. 989993.

Jungnickel, V., et al., "Performance of a MIMO System with overlay Pilots", © 2001 IEEE, pp. 594-598.

Haustein, T., et al., "Performance of MIMO Systems with Channel Inversion", © 2002 IEEE, pp. 35-39.

Huang, H., et al., "Asymptotic Downlink Capacity of Coordinated Cellular Networks", © 2004 IEEE, pp. 850-855.

Besson, O., et al., "On Parameter Estimation of MIMO Flat-Fading Channels with Frequency Offsets", © 2003, pp. 602-613.

Baird, C., Jr., et al., "Performance Criteria for Narrowband Array Processing", Paper No. F7-4, IEEE Conference on Decision and Control, vol. 10, 1971, pp. 564-565.

3GPP TS 36.211, V8.2.0 (Mar. 2008), "$3^{rd}$ Generation Partnership Project; Technical Specification Group Radio Access network; Evolved Universal Terrestrial Radio Access (E-UTRA); Physical Channels and Modulation (Rel. 8)", 67 pgs.

3GPP TS 36.300, V8.8.0 (Mar. 2007), "$3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); overall description; stage 2 (Rel. 8)", 83 pgs.

* cited by examiner

(a) Hadamard, fixed pattern (b) Hadamard, fixed pattern

Fig. 6

MULTI-CELL CHANNEL ESTIMATION IN 3G-LTE BASED VIRTUAL PILOT SEQUENCES

FIELD OF THE INVENTION

The present invention relates to a method and a system for estimating interference channels in a multicellular radio telecommunication system including a plurality base stations and at least a mobile station. Moreover, the present invention relates to a base station and a mobile station in such a multicellular radio telecommunication system. Finally, the present invention relates to a pilot signal adapted to be used for estimating interfering channels in such a multicellular radio telecommunication system.

BACKGROUND OF THE INVENTION

Multi-cell interference is undoubtedly the major limiting factor in full-coverage broadband wireless access networks. Mitigating its effect onto the downlink data transmission is one of the key challenges in future wireless communication systems. The better the knowledge about the interference channels, the better is also the basis for any interference mitigation.

Multi-cell channel knowledge can be exploited by simple, receiver-based schemes as interference rejection combining (IRC) (cf. C. A. Baird and C. L. Zahm, "Performance criteria for narrowband array processing," in *IEEE Conference on Decision and Control*, vol. 10, 1971, pp. 564-565) so as to increase post-equalization SINR (signal-to-noise-ratio where noise includes both thermal noise and interference) of the terminal in the downlink, in particular in the LTE (long term evaluation) downlink, and thus the throughput, or advanced schemes based on cooperative base stations such as joint transmission (JT) (cf. T. Weber, I. Maniatis, A. Sklavos, Y. Liu, E. Costa, H. Haas, and E. Schulz, "Joint transmission and detection integrated network (joint), a generic proposal for beyond 3g systems," in *9th International Conference on Telecommunications (ICT'02)*, Beijing, vol. 3, June 2002, pp. 479-483; H. Huang and S. Venkatesan, "Asymptotic downlink capacity of coordinated cellular networks," in *Conference Record of the Thirty-Eighth Asilomar Conference on Signals, Systems and Computers*, 2004., vol. 1, 2004, pp. 850-855).

In order to estimate the channels of interferers, the base stations (base stations) must transmit pilot symbols as training signals being orthogonal among the antennas of different sectors and sites, wherein at the receiving site in the mobile terminal (MT) the received pilot symbols are compared with a reference in order to judge kind and extent of the interferences in the respective channels. On the other hand, quite a lot of these channels must be estimated to combat the interference until the noise floor is reached. The more interferer channels are distinguishable, the more orthogonal pilots must be transmitted. This consumes a large fraction of the potential capacity gain.

In particular, in the standard of the cellular system LTE, the aforementioned issue has been left open which, however, needs to be considered for a fully working system achieving higher throughput. Therefore, it is of great interest to gain knowledge of the interference channels as already mentioned above. The 3G-LTE (third generation long term evaluation) system provides built-in means to independently estimate the intra-cell channels belonging to the same Node-B based on pilots. So far, there is no efficient proposal of how to extend this to all Node-base station in such a system.

For Node-B cooperation in FDD (frequency division duplex) multi-cell applications any kind of channel state information is required at the Node-base station (coherent channel state information (CSI) or incoherent channel quality information, CQI)). This knowledge may be gained based on a multi-cell channel estimation to be performed at the terminal side based on orthogonal pilots. It is not possible to define as many orthogonal pilots as required for a reasonable estimation of the multi cellular channels since this would reduce the spectral efficiency of the system due to the pilot overhead. So it has to find some kind of a gap in the standard how to orthogonalize the base station signals.

In the prior art, the use of code-division multiplexing is known from the WCDMA (wideband code division multiple access) systems. In this system, the common downlink pilot channel (CDPICH) is spread by a cell-specific length-256 sequence, which gives an estimator gain of at most 24 dB against other signals after correlation over the sequence length. In this way, at least the strongest interference signals can be estimated at the terminal side.

There is no comparable technique available for OFDM-based cellular systems, where the channel is estimated in a frequency-selective manner, and most of the pilot resources available for interference suppression is used for accurate frequency-selective channel estimation. Spreading gains as high as in the WCDMA standard are unknown and not feasible in OFDM systems like 3G LTE.

Moreover, it has been found that it is difficult to obtain a precise downlink CSI as required for joint transmission at the base station; namely, the requirements are stricter than whose for joint detection in the opposite uplink direction (cf. T. Haustein, C. von Helmolt, E. Jorswieck, V. Jungnickel, and V. Pohl, "Performance of MIMO systems with channel inversion," in *IEEE 55th Vehicular Technology Conference*, 2002. *VTC Spring* 2002., vol. 1, 2002, pp. 35-39). As already mentioned above, modern cellular systems may unfortunately not provide as many of orthogonal pilot symbols as need to estimate all channels independently.

SUMMARY OF THE INVENTION

It is an object of the present invention to provide an efficient suggestion of how to extend the channel estimation to all base stations in a multi-cellular radio system.

It is a further object of the present invention to provide a concept for multi-cell channel estimation in the downlink applicable for several physical layer concepts, in particular for coordinated joint transmission and interference rejection combining concepts.

In order to achieve the above and further objects according to a first aspect of the present invention, there is provided a method for estimating interfering channels in a multicellular radio communication system including a plurality of base stations and at least a mobile station, comprising the steps of transmitting pilot signals from the base stations to at least a mobile station, and using a pilot signal received at a mobile station for estimating interferences in the communication channel from the base station which transmits said pilot signal, wherein additional pilot sequences are generated, a pattern is provided which defines a rule for distributing said pilot sequences to the base stations, and said pilot sequences are modulated and superposed onto said pilot signals.

According to a second aspect of the present invention, there is provided a system for estimating interfering channels in a multicellular radio communication system including a plurality of base stations and at least a mobile station, comprising means for transmitting pilot signals from the base stations to at least a mobile station, means for generating additional pilot sequences, means for providing a pattern which defines a rule for distributing said pilot sequences to the base stations, means for modulating and superposing said pilot sequences onto said pilot signals, and means for using a pilot signal received at a mobile station for estimating interferences in the communication channel from the base station which transmits said pilot signal.

According to a third aspect of the present invention, there is provided a base station in a multicellular radio communication system including a plurality of base stations and at least a mobile station, comprising a transmitter for transmitting pilot signals to at least a mobile station, a generator for generating additional pilot sequences according to an individual pattern allocated to this base station, and a modulator for modulating and superposing said pilot sequences onto said pilot signals.

According to a fourth aspect of the present invention, there is provided a mobile station in a multicellular radio communication system including a plurality of base stations and at least a mobile station, comprising a receiver for receiving a pilot signal transmitted from a base station, said pilot signal includes at least a pilot sequence modulated and superposed onto pilot signal, wherein a pattern is provided which defines a rule for distributing pilot sequences to the base stations, and an estimator for estimating interferences in the communication channel from the base station which is determined in accordance with the pilot sequence as transmitting said pilot signal.

According to a fifth aspect of the present invention, there is provided a pilot signal adapted to be used for estimating interfering channels in a multicellular radio communication system including a plurality of base stations and at least a mobile station, including at least an additional pilot sequence which is modulated to this pilot signal, wherein a pattern is provided which defines a rule for allocating said pilot sequence to a predetermined base station or a group of predetermined base stations.

Exemplary embodiments of the present invention are defined in the dependent claims.

The present invention provides a definition of reference signal sequence allocation allowing for optimum channel estimation in multicell scenarios with inter-cell interference. The suggested concept according to the present invention results in a trade-off between the ability to track the interference channels and the mobility of the user. The virtual pilot scheme according to the present invention does not consume any more pilots than in current systems. But it enables mobile terminals to distinguish the more of the strong interference channels the slower they are moved in the service area. Hence, without increasing the pilot overhead, low-mobility terminals can take most benefit of advanced interference mitigation schemes.

Preferably, the concept of the present invention is based on the current draft specification of the 3G-LTE specifying orthogonal pilot signals between different sectors while different sites are not orthogonal but marked with a pseudo-random sequence (PRS) defined by the network operator. The present invention proposes to use not random but deterministic sequences denoted as virtual pilots and provide a pilot reuse scheme based on the partial correlation principle. In this way, channels of nearby base stations may be estimated at an early stage due to the pattern provided according to the present invention, and therefore be separated using a short correlation window, e.g. over two transmission time intervals (TTIs), while estimating the channels of more distant stations requires a longer correlation window and hence a reduced user mobility since the distant cells are attenuated by a higher path loss on average, i.e. these cells are less important for cooperation purpose.

Moreover, it is to be noted here that the virtual pilot sequences as generated and used in accordance with the present invention are not limited to Hadamard sequences, but all kinds of orthogonal sequences may be used as e.g. DFT sequences.

BRIEF DESCRIPTION OF THE DRAWINGS

The invention will now be described based on embodiments with reference to the accompanying drawings in which.

DESCRIPTION OF THE PREFERRED EMBODIMENT

Before an exemplary embodiment will be described in detail, at first the background is described for better understanding of the present invention.

A MIMO (multiple-input multiple-output) transmission on each subcarrier $\Omega$ in OFDMA (orthogonal frequency divisional multiple access) systems, having a number $N_T$ of transmit antennas and a number $N_R$ of receive antennas with $N_T = N_R$, is described by $$y(\Omega) = H(\Omega) \times (\Omega) + n(\Omega), \quad (1)$$

where H indicates the $N_R \times N_T$ channel matrix; x denote the $N_T \times 1$ vector of the transmitted symbols; y and n denote the $N_R \times 1$ vectors of the received signals and the additive white Gaussian noise (AWGN) samples.

In the following, the frequency index $\Omega$ is eliminated, and the multi-cellular MIMO channels in the downlink are considered. The received downlink signal $y_m$ at the mobile terminal m in the cellular environment is given by $$y^m = h_{i,u}^m x_{i,u} + \underbrace{\sum_{\substack{l=1 \\ l \neq u}}^{N_T} h_{i,l}^m x_{i,l} + \sum_{\substack{\forall k,l \\ k \neq i}} h_{k,l}^m x_{k,l} + n}_{z_{i,u}} \quad (2)$$

The desired u-th data stream transmitted from the i-th base station is disturbed by the interference given in $z_{i,u}$.

A practical way to perform interference reduction is directly at the mobile terminal where reliable channel knowledge is available and the interference may be detected. For interference suppression at the mobile terminal, it is required to obtain the system's covariance matrix $R_{XX}$ of the signal, interference and noise, where $\sigma_{x_{k,l}}^2$ and $\sigma_n^2$ are the power of each signal $x_{k,l}$ and the noise, respectively.

$$R_{yy} = \Sigma \sigma_{x_{k,l}}^2 h_{k,l} h_{k,l}^H + \sigma_n^2 I \quad (3)$$

A technique utilizing these estimates for the purpose of interference reduction is the minimum mean square error (MMSE) receiver. By employing multiple receive antennas, it is possible to use this linear receiver technique and thus enhance the desired signal while suppressing the interference. For proper application it is necessary to know the system's covariance matrix $R_{yy} = Z_i + \sigma_{x_{u,i}}^2 h_{u,i} h_{u,i}^H$, defined as $$R_{yy} = \sigma_n^2 I + \sum_{\forall k,l} \sigma_{x_{k,l}} h_{k,l} h_{k,l}^H \quad (4)$$

$$w_i^{MMSE} = \sigma_{xi,u} R_{yy}^{-1} h_i \quad (5)$$

Using Jensen's inequality for convex functions leads to the lower bound of the instantaneous SINR.

$$SINR_i \geq \sigma_{x_{i,u}} \frac{w_i^H h_i h_i^H w_i}{w_i^H z_i w_i} \quad (6)$$

Equation (6) is individually maximized by using the equation (5) (cf. C. A. Baird and C. L. Zahm, "Performance criteria for narrowband array processing," in *IEEE Conference on Decision and Control*, vol. 10, 1971, pp. 564-565). Hence, the achievable SINR (signal-to-noise ratio where noise includes terminal noise and interference) with full channel knowledge for all interfering base station is given by $$SINR_i \geq \frac{\sigma_{x_{i,u}} h_i^H R_{yy}^{-1} h_i}{1 - \sigma_{x_{i,u}} h_i^H R_{yy}^{-1} h_i} \quad (7)$$

One may think of a simple mechanism to estimate the desired matrix. It is possible to obtain this knowledge by estimating the covariance matrix $R_{yy} = E[yy^H]$ of the received signal vector y using several subsequently received data symbols. The Hermitean transpose and expectation operators are denoted by $(\bullet)^H$ and $E[\bullet]$, respectively.

By assuming a transmission of i.i.d. data symbols $x_k$ over channel k and averaging over s symbols the estimation error will decrease with s (cf. V. Jungnickel, T. Haustein, E. Jorswieck, V. Pohl, and C. von Helmolt, "Performance of a MIMO system with overlay pilots," in *Global Telecommunications Conference*, 2001. GLOBECOM '01. IEEE, vol. 1, 2001, pp. 594-598 vol. 1; M. Speth, S. Fechtel, G. Fock, and H. Meyr, "Optimum receiver design for wireless broad-band systems using OFDM. I" *Communications, IEEE Transactions on*, vol. 47, no. 11, pp. 1668-1677, November 1999). The total number of transmitted data symbols across a quasi-static channel is given by S. $\tilde{R}_{yy}$ denotes the estimated covariance matrix as $$\tilde{R}_{yy} = \frac{1}{S} \sum_{\forall s} E\left[\left(\sum_{\forall k,l} h_{k,l} x_{k,l}(s) + n\right)\left(\sum_{\forall k,l} h_{k,l} x_{k,l}(s) + n\right)^H\right] \quad (8)$$

The estimation error between $R_{yy}$ and the estimated covariance matrix $\tilde{R}_{yy}$ will be considered later in detail.

Figure 1:
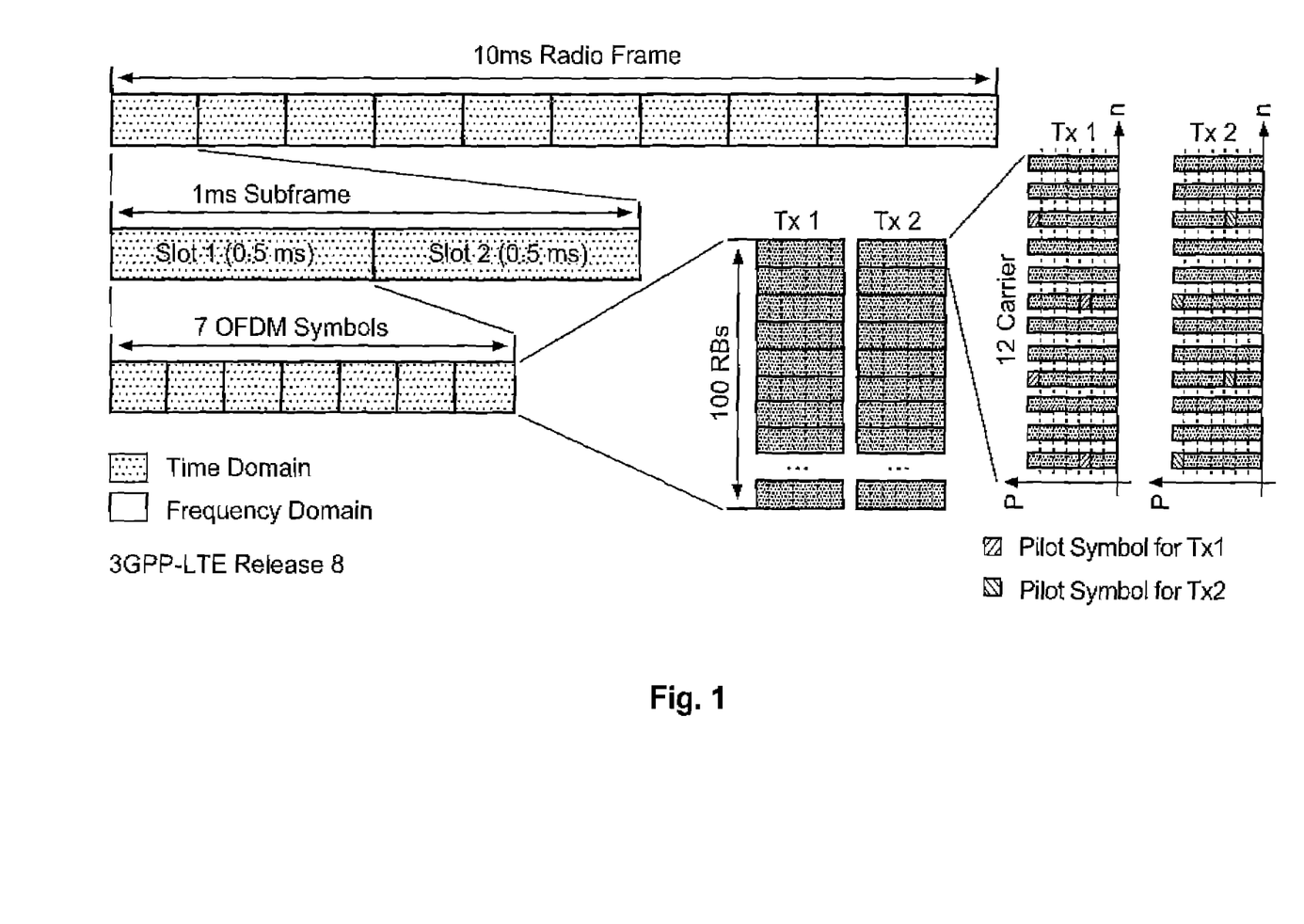
FIG. 1 schematically shows a 3G-LTE framing structure including reserved orthogonal pilot symbols for intra-cell channel estimation.
Figure 2A:
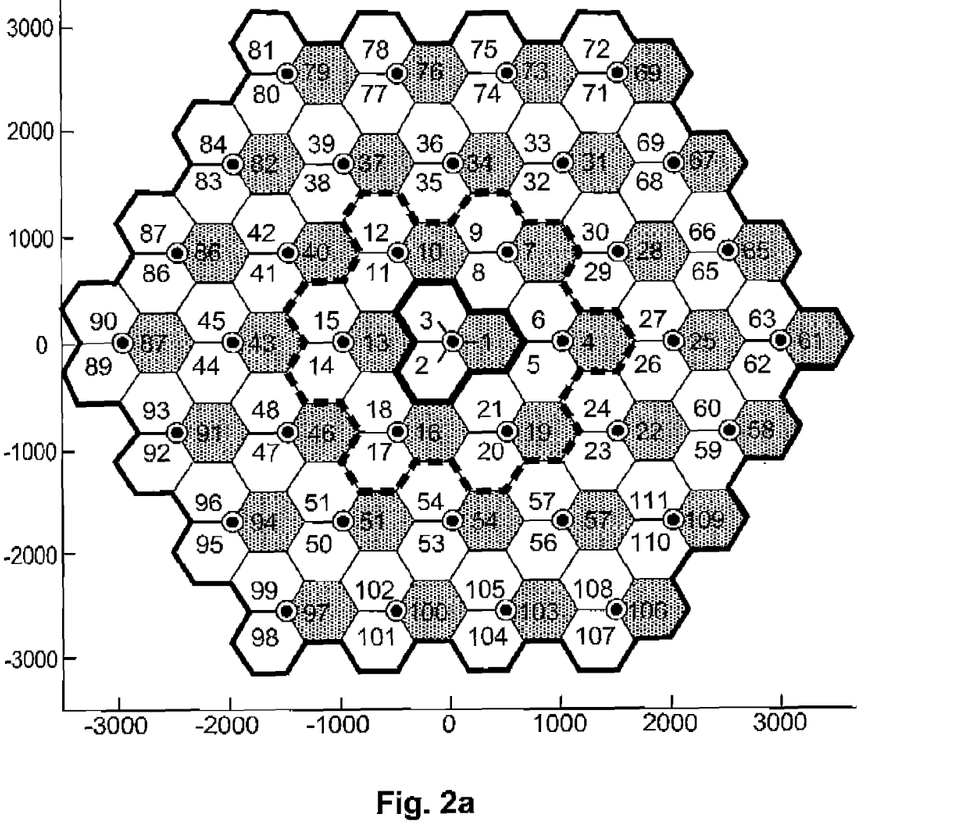
FIG. 2 schematically shows the development of an assignment plane for a virtual pilot pattern given for the first four steps in a triple-sectorized cellular system.
Figure 2B:
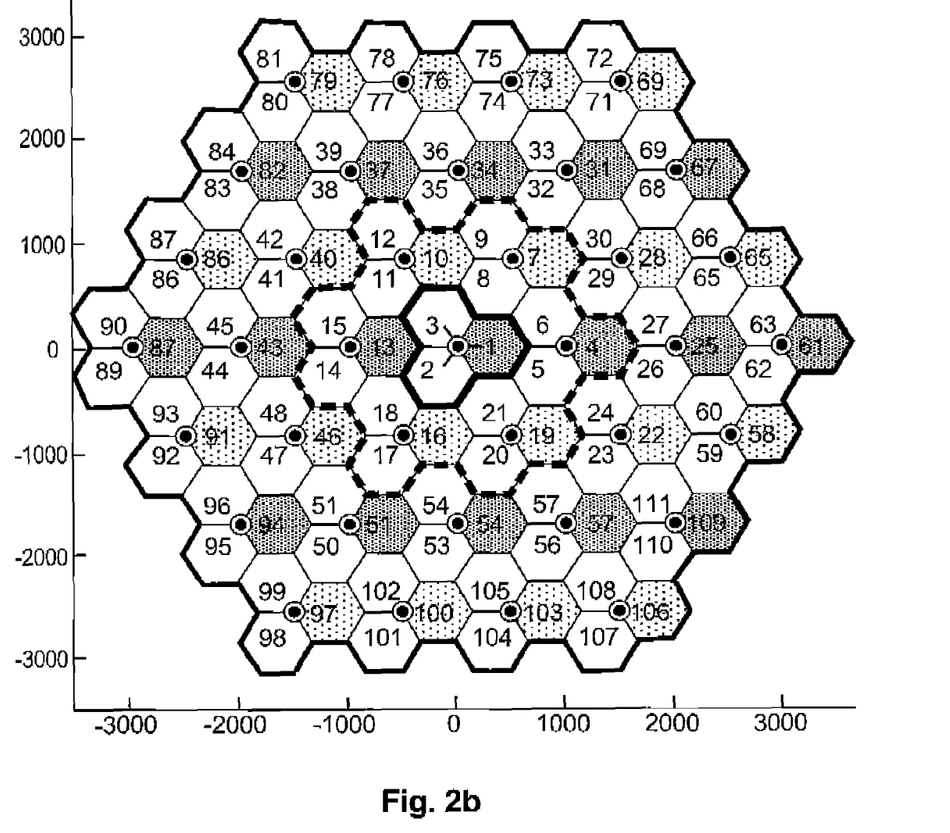
Figure 2C:
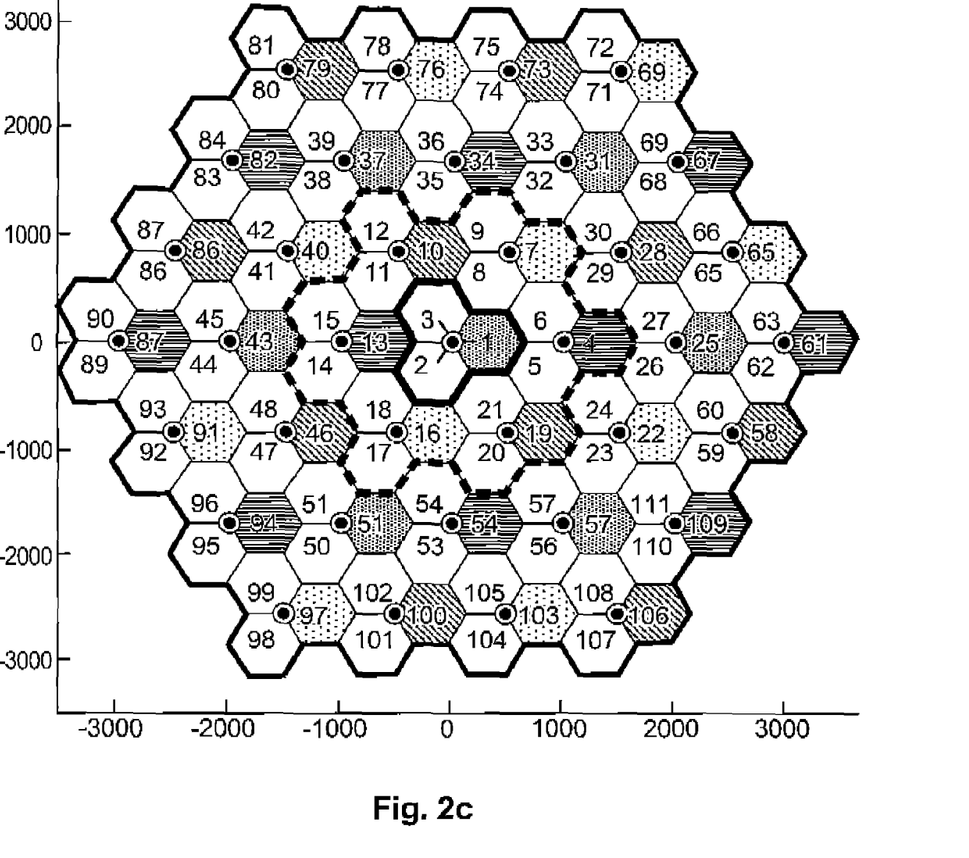
Figure 2D:
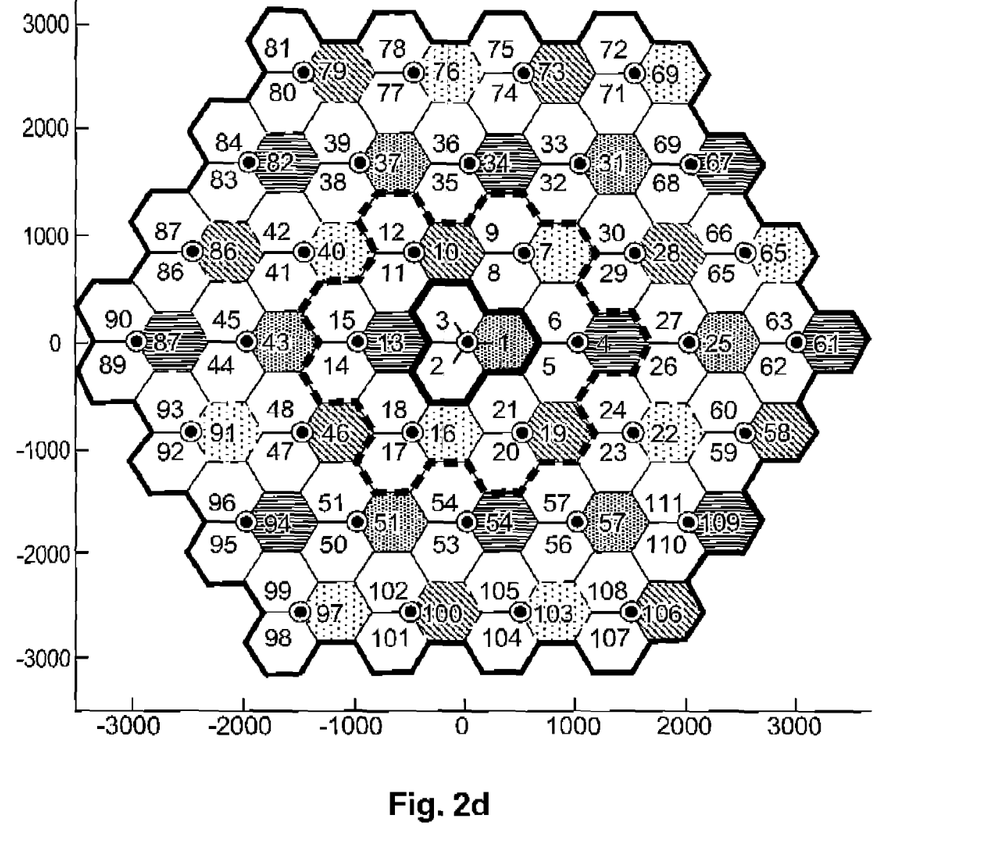

According to the 3G-LTE specification (cf. 3GPP TS 36.211 Release 8), pilot symbols are intended to be used for the purpose of intra-cell channel estimation, as indicated in FIG. 1. FIG. 1 shows the 3G-LTE framing structure including reserved orthogonal pilot symbols for intra-cell channel estimation. Zadoff-Chu sequences of length three enable the separate estimation of all three channels belonging to the sectors of the same base station. Furthermore, pilot symbols for the different transmit antennas are defined and located on different time and frequency positions, i.e. orthogonal, in a resource block. In addition, pilots are scrambled using pseudo-random sequences (PRS) to be defined by the network operators.

The idea is to use additional pilot sequences getting orthogonal over time, e.g. Hadamard or DFT sequences. We define a pattern which defines the rule to distribute these sequences to the cells, i.e. Node-base station. These sequences are modulated and superposed onto the pilot symbols defined in 3G-LTE for different antenna configurations (cf. 3GPP TS 36.300v800, E-UTRA and E-UTRAN—overall description, March 2007) along the time axis, like an additional scrambling sequence. Thus the orthogonal pilot symbols of all sectors belonging to the same Node-B are superposed by the same sequence defined by the pattern.

FIG. 2 schematically shows a development of the assignment plane for a virtual pilot pattern given for four steps with the sequence length being 1, 2, 4, and 8, respectively (according to FIGS. 2a, b, c and d, respectively) in a 3-fold sectorized cellular system, i.e. with each cell consisting of three sectors, wherein decimal numbers indicate the sector index. In FIG. 2 each grey or black colour represents an orthogonal virtual pilot sequence being available with the given sequence length. Starting with sequence length 1 (FIG. 2a), all sectors have the same virtual sequence. With sequence length 2 (cf. FIG. 2b), each $2^{nd}$ row is assigned with another virtual sequence being orthogonal to the original one after 2 time slots. In the next step with sequence length 4 (cf. FIG. 2c), all grey sequences are split into two orthogonal subgroups, and the black sequences are split into another two orthogonal subgroups. In the next step with sequence length 8, the diagonal elements are split into subgroups, i.e. each $4^{th}$ diagonal row repeats. The same is intended to be used in the other diagonal direction. The final result, valid for sequence length 16, is given in FIG. 3. The sequence assignment is given in Table 1.

TABLE 1

Sequence assignment with Hadamard sequences spread over space (rows) and time (columns) domain.

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 0 | 1 | 1 | 1 | 1 | 1 | 1 | 1 | 1 | 1 | 1 | 1 | 1 | 1 | 1 | 1 | 1 |
| 1 | 1 | -1 | 1 | -1 | 1 | -1 | 1 | -1 | 1 | -1 | 1 | -1 | 1 | -1 | 1 | -1 |
| 2 | 1 | 1 | -1 | -1 | 1 | 1 | -1 | -1 | 1 | 1 | -1 | -1 | 1 | 1 | -1 | -1 |
| 3 | 1 | -1 | -1 | 1 | 1 | -1 | -1 | 1 | 1 | -1 | -1 | 1 | 1 | -1 | -1 | 1 |
| 4 | 1 | 1 | 1 | 1 | -1 | -1 | -1 | -1 | 1 | 1 | 1 | 1 | -1 | -1 | -1 | -1 |
| 5 | 1 | -1 | 1 | -1 | -1 | 1 | -1 | 1 | 1 | -1 | 1 | -1 | -1 | 1 | -1 | 1 |
| 6 | 1 | 1 | -1 | -1 | -1 | -1 | 1 | 1 | 1 | 1 | -1 | -1 | -1 | -1 | 1 | 1 |
| 7 | 1 | -1 | -1 | 1 | -1 | 1 | 1 | -1 | 1 | -1 | -1 | 1 | -1 | 1 | 1 | -1 |
| 8 | 1 | 1 | 1 | 1 | 1 | 1 | 1 | 1 | -1 | -1 | -1 | -1 | -1 | -1 | -1 | -1 |
| 9 | 1 | -1 | 1 | -1 | 1 | -1 | 1 | -1 | -1 | 1 | -1 | 1 | -1 | 1 | -1 | 1 |
| A | 1 | 1 | -1 | -1 | 1 | 1 | -1 | -1 | -1 | -1 | 1 | 1 | -1 | -1 | 1 | 1 |
| B | 1 | -1 | -1 | 1 | 1 | -1 | -1 | 1 | -1 | 1 | 1 | -1 | -1 | 1 | 1 | -1 |
| C | 1 | 1 | 1 | 1 | -1 | -1 | -1 | -1 | -1 | -1 | -1 | -1 | 1 | 1 | 1 | 1 |
| D | 1 | -1 | 1 | -1 | -1 | 1 | -1 | 1 | -1 | 1 | -1 | 1 | 1 | -1 | 1 | -1 |
| E | 1 | 1 | -1 | -1 | -1 | -1 | 1 | 1 | -1 | -1 | 1 | 1 | 1 | 1 | -1 | -1 |
| F | 1 | -1 | -1 | 1 | -1 | 1 | 1 | -1 | -1 | 1 | 1 | -1 | 1 | -1 | -1 | 1 |

Figure 3:
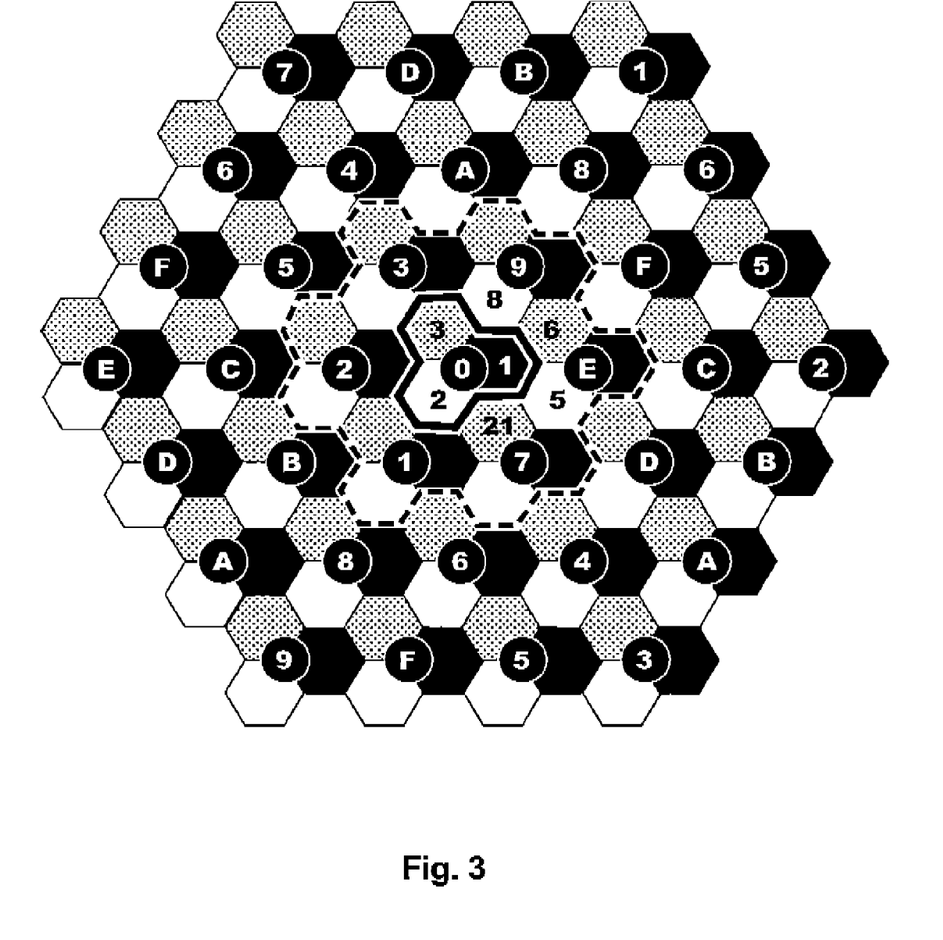
FIG. 3 schematically shows a pilot reuse pattern based on orthogonal code sequence as a final result of the steps of FIG. 2 in a triple-sectorized cellular system.

In the exemplary embodiment, Hadamard sequences are spread over the time domain from slot to slot with a maximum sequence length of 16. FIG. 3 visualizes the suggested pilot grid, where the number (hex-based) indicates the code $c_n$ chosen from the sequence matrix C, i.e. the row of the Hadamard matrix of maximum length N=16. The decimal numbers indicate the sequence length over the time domain. Table 1 shows that the Hadamard sequences are spread over space (indicative by the rows in Table 1) and time (indicated by columns in Table 1) domain. It is to be noted that the suggested scheme covers different sequence lengths n={1, 2, 4, 8, 16}, since the sequence pattern repeats itself every n rows. Thus the system may benefit from a more precise channel estimation for increasing sequence length n.

It is further to be noted here that according to the definition of "block-orthogonal sequence" as to be used in the present context each row of a block-orthogonal sequence matrix is orthogonal to all other rows of the same matrix with full correlation length, i.e. $CC^H=I$. Reducing the correlation length to n yields to a matrix with block wise orthogonal properties, where each block is of size n×n. Furthermore, each n-th row should be identical for a given correlation length n.

The suggested scheme assigning virtual pilot sequences to the multi-cell system is translational invariant with respect to the estimation error. Its block-orthogonality is sustained even after a cyclic shift. The suggested scheme can be easily extended to the case of larger correlation length. Furthermore, each kind of block-orthogonal sequence may be applied instead of Hadamard sequences yielding the same performance. E.g. resorting the columns and rows of the DFT matrix, such that block-orthogonality is given, leads to sequences having the same properties required by the correlation-based estimator. In this way, the virtual pilots can be interpreted as discrete frequency shifts by a fraction of a subcarrier spacing and partial correlation is a filtering process with limited spectral resolution.

According to the scheme of FIG. 3, the distance between cells using the same Hadamard sequence are maximized. After 4 cells in a row the same sequence is assigned. That applies to the horizontal and both diagonal alignments. All cells in a radius of 4 have orthogonal sequences to the cell in the middle of the scheme. The assignment of the Hadamard sequences to cells is completely defined by an arbitrary rhombus containing 16 cells each one using another pilot sequence. The rhombus is repeated to fill an infinity plane. One possible rhombus in FIG. 3 is enclosed by the cells E,0,1,7. It is to be noted that each permutation of the assignment would effect the channel estimation mean square error (MSE). In the suggested scheme it is guaranteed that the mean channel estimation error of a mobile terminal is independent of the cell where it is placed. That means it is sufficient to consider e.g. cell 0 of FIG. 3 for a simulation only.

At the mobile terminal, a correlation-based estimator is used to separate the channels $h_{k,l}$ for the n distinct groups. The main reason to use the correlation-based estimator is its moderate computational complexity. The correlation-based estimator is given by $$\tilde{h}_v = \frac{1}{n}\sum_{p=0}^{n-1} c_v^*(p) y^m(p), \text{ with } v = \{0, \ldots, n-1\}. \quad (9)$$

where $c_n(p)$ and $y^m(p)$ denote the code symbol and the received signal vector at a given discrete time index p, respectively.

For performance evaluation, it is considered a 3GPP SCME (spatial channel model extended) channel model generating SISO (single-input single-output) channels. As indicated in the parameter list according to Table 2, static channels are assumed for the analysis, except stated otherwise. For the sectorization, the simulation scenario is initialized cell-wise, i.e. independently for each base station. The large-scale parameters are kept fixed for all 3 sectors belonging to the same base station while the small scale parameters are randomized. A so-called scenario-mix is introduced yielding different channel states for the base stations, e.g. LOS or NLOS, which seems to be more realistic than assuming same conditions for all channels. The state is changed within the simulation following a distance-dependent stochastic process based on experimental results.

TABLE 2

Simulation assumptions.

| parameter | value |
|---|---|
| channel model | 3GPP SCME |
| type | Monte Carlo, 5000 user drops |
| scenario | urban-macro |
| additional modifications | scenario-mix |
| $f_c$ | 2 GHz |
| intersite distance | 500 m |
| number of base station | 37 having 3 sectors each |
| base station height | 32 m |
| mobile terminal height | 2 m |
| SNR | ∞ |

For comparison of the different estimation errors, the mean normalized MSE is used, where Tr{•} denotes the trace operator $$MSE = \frac{\sum_{\forall n} Tr\{E[(R_{yy}(n) - \tilde{R}_{yy}(n))(R_{yy}(n) - \tilde{R}_{yy}(n))^H]\}}{N \cdot Tr\{E[R_{yy}(n)R_{yy}^H(n)]\}} \quad (10)$$

Figure 4:
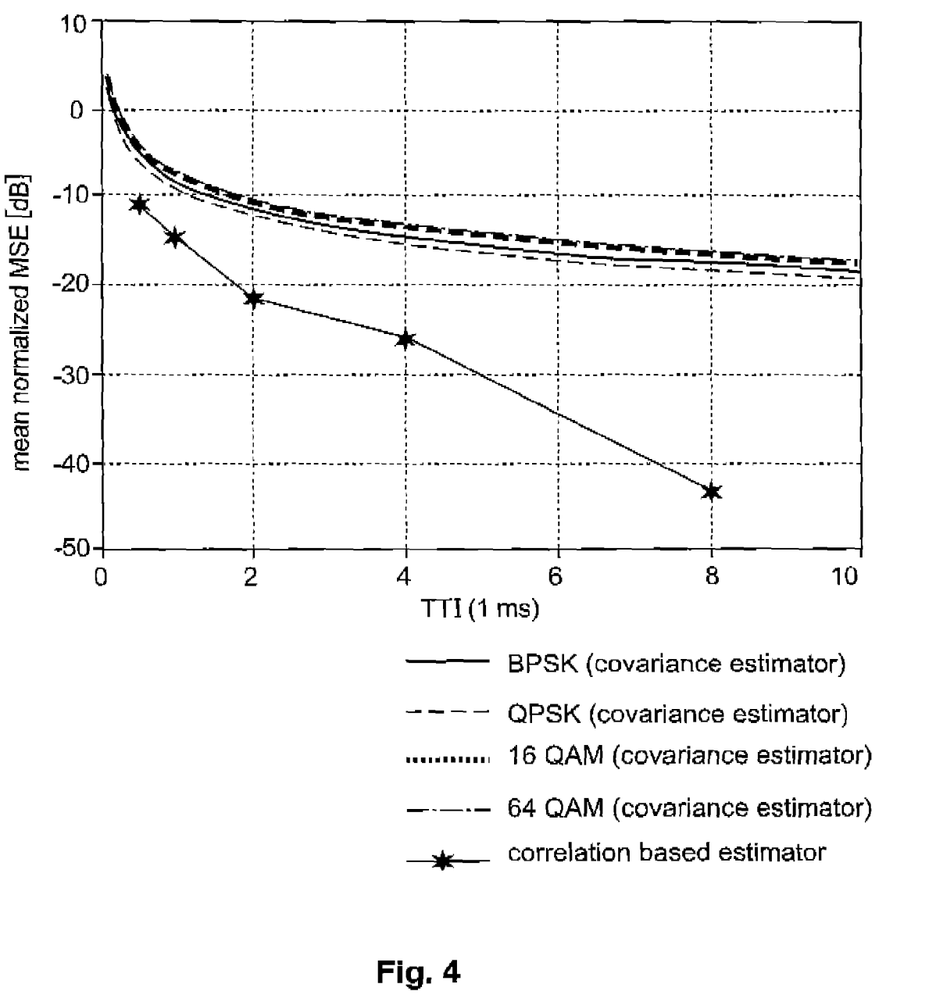
FIG. 4 is a graph showing a mean normalized mean square error (MSE) over transmission time interval (TTI) for a received signal covariance estimation technique and a multi-cell channel estimation technique.

Results for the covariance estimation are shown in FIG. 4. It compares the mean normalized MSE for the covariance and correlation-based estimators, applicable over all OFDM data symbols or using virtual pilots, respectively. The correlation-based estimator requires at least a number of 7 OFDM symbols to be transmitted, i.e. one correlation length, whereas the covariance estimator is capable to start the estimation with the first transmitted data symbol. It turns out that the correlation-based estimator outperforms the covariance estimator already for correlation length of one slot.

Figure 5:
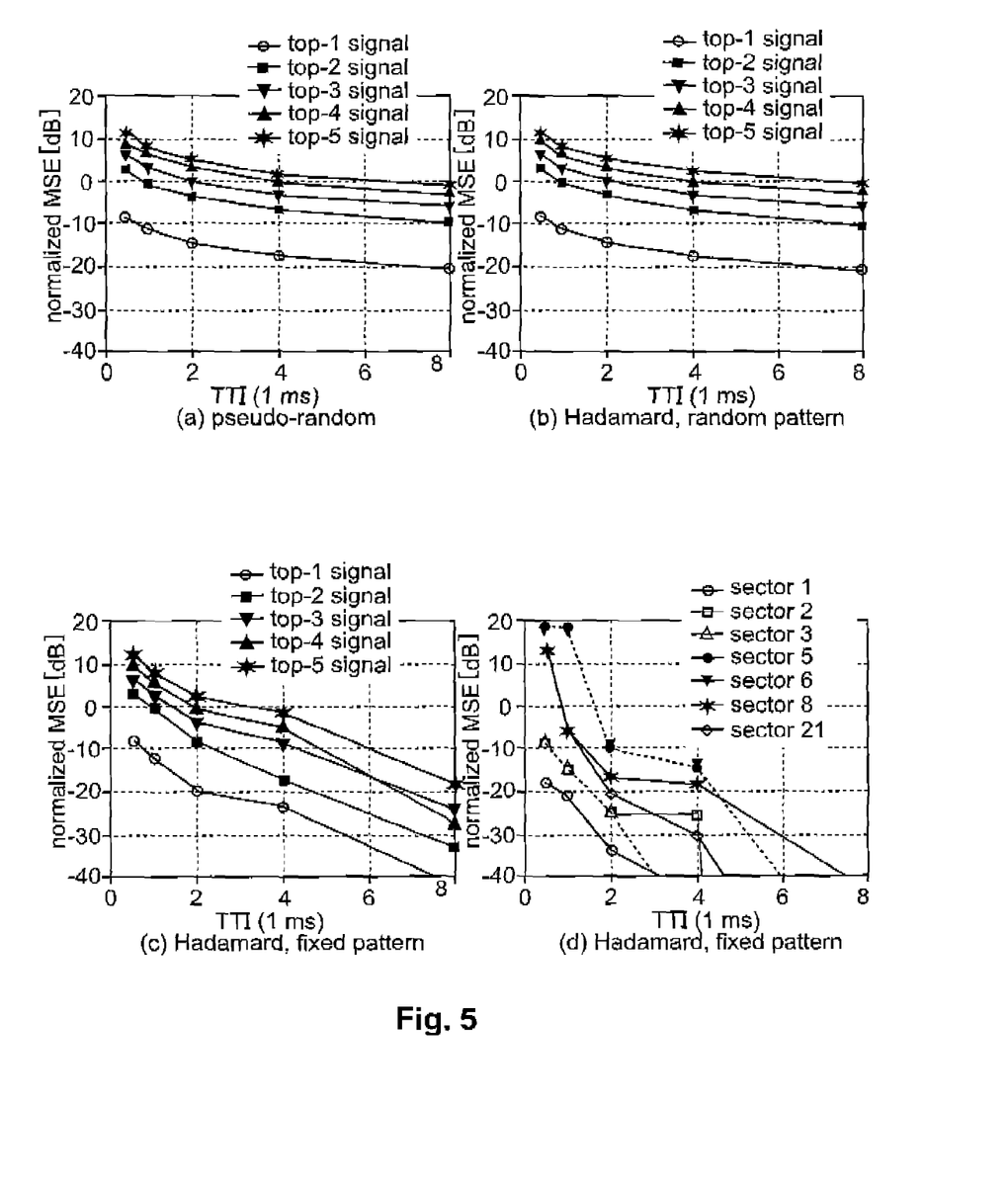
FIG. 5 is a graph showing a normalized mean square error (MSE) obtained for a correlation estimator over transmission time interval (TTI) in case of a static channel for the five strongest sectors (FIGS. 5a, b and c) and for inner sectors (FIG. 5d)

FIG. 5 shows the MSE normalized by the receive power of the associated sector. It compares the different performance in the channel estimation process using virtual pilots based on pseudo-random (FIG. 5(a)), randomly arranged Hadamard (FIG. 5(b)) and Hadamard sequences (FIG. 5(c)) arranged in the specific pattern shown in FIG. 3. In these figures, the achievable MSE is given for top-N strongest sectors showing instantaneously the five highest receive powers at the mobile terminal. It turns out that using virtual pilots based on randomly arranged orthogonal sequences, e.g. Hadamard (FIG. 5(b)), cannot reduce the MSE compared to the case of using pseudo-random sequences. However, the suggested sequence reuse pattern assigning Hadamard sequences to the base stations shows a superior performance compared to the random arrangement of sequences. Within that scheme, base stations being closely located to each other are assigned to orthogonal sequences requiring smaller correlation lengths to be separable.

FIGS. 5(c) and 5(b) indicate the achievable MSE for the top-N strongest sectors as well as for a fixed set of sectors. For the latter, it is to be observed that the error of the multi-cell channel estimation is less than −10 dB for sequence length larger than 4, i.e. 2 TTI (transmission timing interval), for all sectors with index={1,2,3,8,21}; as indicated in FIG. 3. After full correlation length, the channel estimation of adjacent base stations is almost perfect, i.e. with a SINR>40 dB. However, estimating the top-N strongest channels may cause higher errors. This is due to the fact that the top-N strongest channels may not belong to the adjacent base stations. Nevertheless, by using a more orthogonal grid for larger correlation length it is possible to reduce the MSE as indicated in FIG. 5(c). The reduction of the MSE for the strongest signals is significant. For correlation length of 16, i.e. 8 TTI, the MSE is below −19 dB for the top-5 strongest channels.

For quasi-static channels, the suggested multi-cell channel estimation approach may be implemented easily, wherein sites must be synchronized, e.g. by using the global positioning system (GPS).

In the following it is evaluated the performance degradation in the estimation process due to time varying channels, e.g. caused by a certain velocity of the mobile terminal or simply phase noise. Introducing a constant phase rotation to a static channel would result in the simplest form of a time varying channel (cf. O. Besson and P. Stoica, "On parameter estimation of MIMO flat-fading channels with frequency offsets," *IEEE Transactions on Signal Processing*, vol. 51, no. 3, pp. 602-613, March 2003) as follows:

$$y^m(p) = h_{i,u}^m e^{\frac{jp\phi_{i,u}}{N}} x_{i,u} + \underbrace{\sum_{\substack{l=1 \\ l \neq u}}^{N_T} h_{i,l}^m e^{\frac{jp\phi_{i,l}}{N}} x_{i,l} + \sum_{\substack{\forall k,l \\ k \neq i}} h_{k,l}^m e^{\frac{jp\phi_{k,l}}{N}} x_{k,l}}_{z_{i,u}} + n \quad (11)$$

where p is the discrete time index p∈(0, ..., n−1). The random phase is defined in the range 0≤Φ≤2π/9 having i.i.d. properties for all base stations and transmit elements in the environment.

Figure 6:
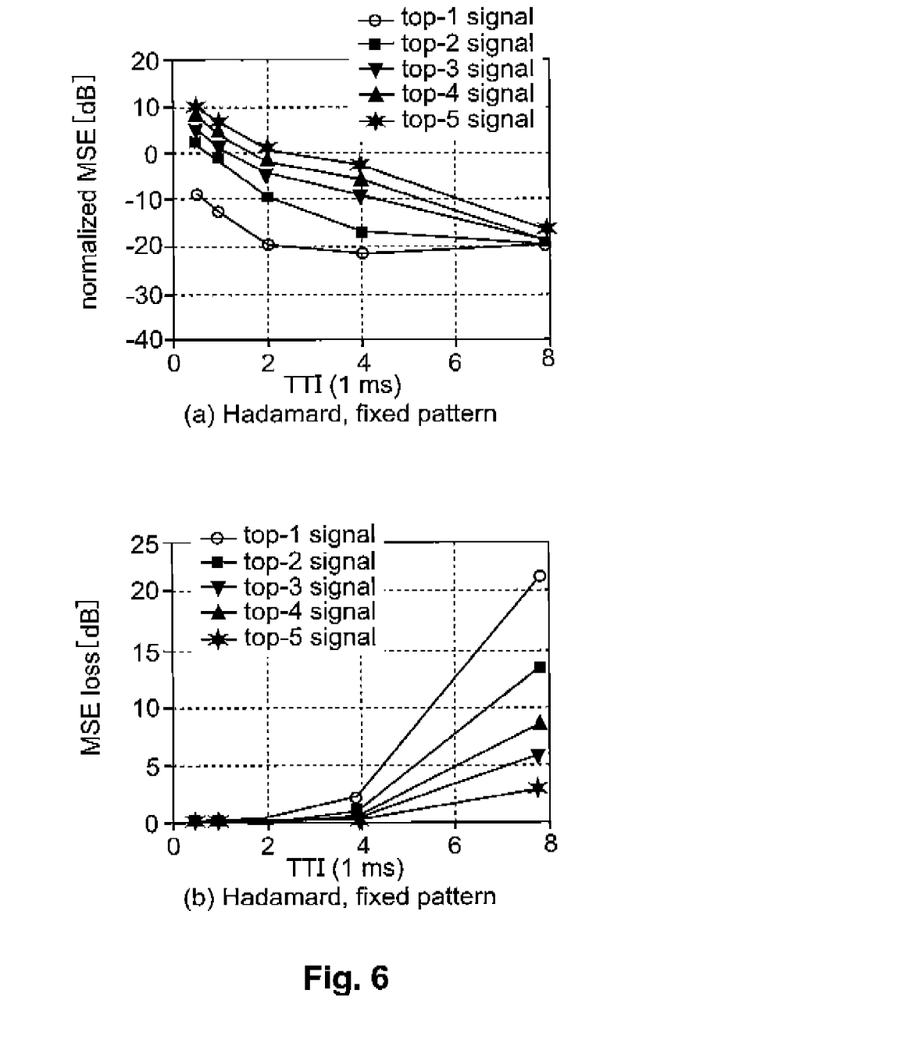
FIG. 6 is a graph showing a normalized mean square error (MSE) obtained for the correlation estimator using the suggested virtual pilot pattern according to an embodiment of the present invention over transmission time interval (TTI) in case of a dynamic channel for the five strongest sectors (FIG. 6a) and the loss in the normalized mean square error compared to static channel conditions (FIG. 6b).

With these parameters, the evaluation for the achievable MSE is conducted again resulting in the performance given below. FIG. 6(a) indicates the achievable MSE in case of time variant channel conditions. It turns out that all estimation errors may converge to almost the same value, i.e. ≈20 dB, for the maximum correlation length n=16. The estimation error of the strongest signal may even increase from correlation length n=8 to n=16. In this case, the error due to the phase rotation prevails the estimator gain. The loss in the normalized MSE compared to static channel conditions is given in FIG. 6(b). Again it turns out, that the estimation error basically increases for those channels with lowest MSE from the static case.

For cells a, b it is assumed a≡b, if each base station $a_1$ has a correspondent base station $b_1$, whereas a mobile terminal placed in a measuring $a_1$ can expect the same channel estimation error like a mobile terminal placed in b measuring $b_1$. The error depends on the distances and pilot sequences of all base stations. More precisely, a≡b is assumed, if there exists an bijective map $f_{ab}$ C×C→C×C, where C is the infinite set of cells. For arbitrary $a_1$, $a_2$ with $f_{ab}(a_1,a_2)=(b_i,b_2)$ the map must have the following properties: The distance between a, $a_1$ is equal to b, $b_1$. The same holds for a, $a_2$ and b, $b_2$. Also both pairs of pilot sequences assigned to $a_1$, $a_2$ and $b_1$, $b_2$ have the same orthogonality property (true/false) after a correlation length of 2, 4, 8 and 16. In other words, each pair $a_1$, $a_1$ has a corespondent pair $b_1$, $b_2$ with the same distance and sequence (orthogonality) property. Regarding to the suggested scheme the following bijective map for any a, b∈C is defined:

$$f_{ab}(a \oplus (r_1,d_1), a \oplus (r_2,d_2)) = (b \oplus (r_1,d_1), b \oplus (r_2,d_2)),$$

where $r_1$, $d_1$, $r_2$, $d_2$ are arbitrary integer numbers, c⊕(r,d) defines a new cell going r steps right and d steps down right along the hexagonal grid. The above mentioned distance property is thus fulfilled.

After all, the suggested scheme uses a specific cell planning for the sequences by which pilots of different sites are scrambled. According to the described embodiment, the highest order of orthogonality, i.e. the shortest correlation length, is used for the adjacent cells. As a result, it is possible to estimate the channels of the interferers separately which are most likely also the strongest interfering (average) Node-Bs. Node-Bs which are more distant from the terminal are orthogonal only if a longer correlation window is used. As shown in FIG. 3 by example, sectors 1, 2, 3 are already orthogonal in the standard, wherein it is assumed that the interior cell (marked as 0) has the all-ones sequence.

The longer the correlation window, i.e. the time period for the channel estimation corresponding to the effective sequence length, the more distant Node-B channels may be estimated independently. The suggested pilot sequence pattern is scalable over time.

The scheme can be easily extended to larger sequence and correlation lengths. The maximum sequence length should be 170 in LTE.

With the suggested scheme, mobility-dependent interference suppression becomes possible. A highly mobile terminal has a channel which varies quickly over time. In this case, only the nearest interferes can be identified. At lower speed, a longer correlation window becomes possible, and more interferes can be estimated. In this way, the performance of slow terminals can be optimized, but also the fast terminals can benefit from the interference suppression. As a result of interference suppression for slow terminals, these terminals have higher spectral efficiency and thus occupy less resources, which can in turn be redistributed to high-speed terminals.

The above described system may be implemented by computer software or by computer hardware or by a combination of computer software and hardware, preferably in the memory and processor of the base stations and the mobile terminal(s).

Finally, it should be noted that the above described embodiment is of an example for implementing the present invention, but the scope of the present invention should not necessarily be limited by the above description. The scope of the present invention is defined by the following claims.

The invention claimed is:

1. A method for estimating interfering channels in a multicellular radio communication system including a plurality of base stations and at least one mobile station, comprising the steps of
    transmitting pilot signals from the base stations to the at least one mobile station, and
    using a pilot signal received at the at least one mobile station for estimating interferences in a communication channel from the base station which transmits said pilot signal, wherein
    additional pilot sequences are generated according to a pattern which defines a rule for distributing said pilot sequences to the base stations based on corresponding correlation lengths over space and time domains, where distributed pilot sequences are block-orthogonal sequences with block-wise orthogonal properties and where a block size is related to a corresponding correlation length, and
    said pilot sequences are modulated and superposed onto said pilot signals, wherein pilot symbols belonging to the same base station are superposed by the same pilot sequence defined by the pattern.

2. The method according to claim 1, wherein said pattern defines a predetermined number of predetermined different length for said pilot sequences, each of said different sequence length being allocated to a predetermined base station or a group of predetermined base stations.

3. The method according to claim 2, wherein the sequence length corresponds to the time period for estimating interfering channels.

4. The method according to claim 2, wherein the longer the sequence length is, the more distant base station channels are estimated independently.

5. The method according to claim 4, wherein the shortest sequence length is allocated to adjacent base stations.

6. The method according to claim 5, wherein the sequence with the shortest length comprises the highest order of orthogonality, and wherein the pattern defines different orders of orthogonality, the highest order of orthogonality being used for adjacent base stations.

7. The method according to claim 1, wherein said pilot sequences are orthogonal pilot sequences.

8. The method according to claim 7, wherein said pilot sequences are Hadamard sequences.

9. The method according to claim 7, wherein the pattern defines different orders of orthogonality, the highest order of orthogonality being used for adjacent base stations.

10. The method according to claim 1, wherein said pattern is scalable over time.

11. The method according o claim 1, wherein the pilot signals comprise symbols.

12. The method according to claim 11, wherein the symbols are orthogonal symbols.

13. The method according to claim 1, wherein the multi cellular radio communication system is an OFDM-based cellular system.

14. The method according to claim 13, wherein the multi cellular radio communication system is a system according to the 3G-LTE standard.

15. A system for estimating interfering channels in a multicellular radio communication system including a plurality of base stations and at least one mobile station, comprising at individual ones of the plurality of base stations:
    a transmitter configured for transmitting pilot signals from the corresponding individual base station to the at least one mobile station,
    a generator configured for generating additional pilot sequences according to a pattern which defines a rule for distributing said pilot sequences to the plurality of base stations based on corresponding correlation lengths over space and time domains, where distributed pilot sequences are block-orthogonal sequences with block-wise orthogonal properties and where a block size is related to a corresponding correlation length,
    a modulator configured for modulating and superposing said pilot sequences onto said pilot signals, wherein pilot symbols belonging to the same base station are superposed by the same pilot sequence defined by the pattern, and
    where the at least one mobile station comprises an estimator configured for using a pilot signal received at the at least one mobile station to estimate interferences in a communication channel from the base station which transmits said pilot signal.

16. A base station in a multicellular radio communication system including a plurality of base stations and at least one mobile station, comprising
    a transmitter for transmitting pilot signals to the at least one mobile station,
    a generator for generating additional pilot sequences according to an individual pattern allocated to the base station, wherein the individual pattern defines a rule for distributing said pilot sequences to the base station based on corresponding correlation lengths over space and time domains, where distributed pilot sequences are block-orthogonal sequences with block-wise orthogonal properties and where a block size is related to a corresponding correlation length, and
    a modulator for modulating and superposing said pilot sequences onto said pilot signals, wherein pilot symbols belonging to the base station are superposed by the same pilot sequence defined by the pattern, and
    wherein the least one mobile station comprises an estimator for using a pilot signal received at the at least one mobile station to estimate interferences in communication channel from the base station which transmits said pilot signal.

17. A mobile station in a multicellular radio communication system including a plurality of base stations and at least the mobile station, comprising a receiver for receiving a pilot signal transmitted from a base station, said pilot signal includes at least a pilot sequence modulated and superposed onto said pilot signal, wherein a pattern is provided which defines a rule for distributing pilot sequences to the base stations based on corresponding correlation lengths over space and time domains, where distributed pilot sequences are block-orthogonal sequences with block-wise orthogonal properties and where a block size is related to a corresponding correlation length, and an estimator for estimating interferences in the communication channel from the base station which is determined in accordance with the pilot sequence as transmitting said pilot signal.

18. A computer program product comprising instructions embodied on a non-transitory computer-readable storage medium which, when loaded into an apparatus, is adapted to be used with a pilot signal for estimating interfering channels in a multicellular radio communication system including a plurality of base stations and at least one mobile station, the instructions comprise:

transmitting pilot signals from the plurality of base stations to the at least one mobile station, using a pilot signal received at the at least one mobile station for estimating interferences in a communication channel from the base station which transmits said pilot signal, wherein additional pilot sequences are generated according to a pattern which defines a rule for allocating said pilot sequences to a predetermined base station or a group of predetermined base stations of the plurality of base stations based on corresponding correlation lengths over space and time domains, where distributed pilot sequences are block-orthogonal sequences with block-wise orthogonal properties and where a block size is related to a corresponding correlation length, and said pilot sequences are modulated and superposed onto said pilot signals, wherein pilot symbols belonging to the predetermined base station or the group of predetermined base stations are superposed by said same pilot sequence defined by the pattern.

19. A computer program product according to claim 18, wherein said pattern defines a predetermined number of predetermined different length for pilot sequences, each of said different sequence length being allocated to a predetermined base station or a group of predetermined base stations.

20. A computer program product according to claim 19 wherein the sequence length corresponds to the time period for estimating interfering channels.

21. A computer program product according to claim 19 wherein the longer the sequence length is, the more distant base station channels are estimated independently.

22. A computer program product according to claim 21, wherein the shortest sequence length is allocated to adjacent base stations.

23. A computer program product according to claim 22, wherein the sequence with the shortest length comprises the highest order of orthogonality, and wherein the pattern defines different orders of orthogonality, the highest order of orthogonality being used for adjacent base stations.

24. A computer program product according to claim 18, wherein said pilot sequence is an orthogonal pilot sequence.

25. A computer program product according to claim 24, wherein said pilot sequence is a Hadamard sequence.

26. A computer program product according to claim 24, wherein the pattern defines different orders of orthogonality, the highest order of orthogonality being used for adjacent base stations.

27. A computer program product according to claim 18, wherein said pattern is scalable over time.

28. A computer program product according to claim 18, wherein the pilot signal comprise at least one symbol.

29. A computer program product according to claim 28, wherein the at least one symbol is an orthogonal symbol.

30. A computer program product according to claim 18, wherein the multi cellular radio communication system is an OFDM-based cellular system.

31. A computer program product according to claim 30, wherein the multi cellular radio communication system is a system according to the 3G-LTE standard.

* * * * *